United States Patent
Poulsen

(10) Patent No.: US 6,299,662 B1
(45) Date of Patent: Oct. 9, 2001

(54) FILTER CARTRIDGE

(75) Inventor: Jørgen Poulsen, Nakskov (DK)

(73) Assignee: Nordic Air Filtration A/S, Nakskov (DK)

( * ) Notice: Subject to any disclaimer, the term of this patent is extended or adjusted under 35 U.S.C. 154(b) by 0 days.

(21) Appl. No.: 09/485,462

(22) PCT Filed: Aug. 18, 1998

(86) PCT No.: PCT/DK98/00356

§ 371 Date: Feb. 7, 2000

§ 102(e) Date: Feb. 7, 2000

(87) PCT Pub. No.: WO99/10072

PCT Pub. Date: Mar. 4, 1999

(30) Foreign Application Priority Data

Aug. 21, 1997 (DK) .................................... 0957/97

(51) Int. Cl.[7] .................................. B01D 50/00
(52) U.S. Cl. .................. 55/498; 55/377; 55/502
(58) Field of Search ............... 55/377, 378, 379, 55/498, 502; 210/450, 473, 474

(56) References Cited

U.S. PATENT DOCUMENTS

| | | |
|---|---|---|
| 4,266,954 * | 5/1981 | Oare et al. .............................. 55/377 |
| 4,272,263 * | 6/1981 | Hancock .................................. 55/377 |
| 4,292,057 * | 9/1981 | Ulvestad et al. ....................... 55/377 |
| 4,293,321 | 10/1981 | Kordas . |
| 4,310,336 * | 1/1982 | Peterson ................................. 55/377 |
| 5,211,846 | 5/1993 | Kott . |
| 5,308,485 | 5/1994 | Griffin . |
| 5,632,791 | 5/1997 | Oussoren . |
| 5,964,909 * | 10/1999 | Brunner ................................. 55/377 |

FOREIGN PATENT DOCUMENTS

| | | |
|---|---|---|
| 034 197 A2 | 8/1981 | (EP) . |
| WO 90/11116 | 10/1990 | (WO) . |

* cited by examiner

Primary Examiner—David A. Simmons
Assistant Examiner—Minh-Chan T. Pham
(74) Attorney, Agent, or Firm—Kilpatrick Stockton LLP

(57) ABSTRACT

Filter cartridge for insertion in a cartridge opening in a plate, where the filter cartridge includes a predominantly cylindrical filter and an outer, annular collar which is made of an elastomer or rubber, which seals against the predominantly cylindrical filter, and where the annular collar has a flange which, when the collar is inserted, lies up against a first side of the plate with the cartridge opening. The filter cartridge also includes an expansion part which is configured to be inserted in the outer annular collar, in that the expansion part is inserted into the collar in the axial direction from that side on which the flange is disposed, and that the expansion part is made of a material which is relatively stiff in comparison to the collar, and includes a first ridge and a second ridge which, when the expansion part is inserted in the collar, lies opposite the first side of the plate in which the cartridge opening is provided.

4 Claims, 6 Drawing Sheets

FILTER CARTRIDGE

FIELD OF THE INVENTION

The present invention concerns a replacable filter cartridge with expansion part.

BACKGROUND OF THE INVENTION

Such cylindrical filter cartridges are inserted in so-called filter housings, whereby the filter cartridge is inserted in a circular cartridge opening, e.g. in a bottom plate in the respective filter housing, and is secured in the cartridge opening by an upper collar on the filter cartridge. A multiple of these filter cartridges can be placed in a filter housing.

The filters are used e.g. for the cleaning of air, in that a suction apparatus sucks air through the filter and further into the filter housing.

Particles of dust and impurities settle as a layer on the outer side of the cylindrical filters, which at suitable intervals are cleaned e.g. by blowing air through the filter in the opposite direction or by shaking the filter housing. After some time, the filters get worn-out and must therefore be easy to replace.

This object forms the basis of patent publication U.S. Pat. No. 5,632,791, which discloses a substantially cylindrical, pleated filter cartridge which comprises a resilient top sleeve in which there is formed a peripheral groove, an inner, cylindrical, relatively stiff screen, an outer pleated filter cartridge and a resilient bottom element. The top sleeve is configured to fit into the circular cartridge opening in the bottom cap of the filter housing.

This type of filter cartridge is mounted inside the filter housing and, in the mounted condition, protrudes out of the housing.

In addition to the peripheral groove, the top sleeve of the filter cartridge comprises a collar which prevents the cartridge from moving through the actual cartridge opening in the filter housing. Moreover, a segment of the top sleeve below the peripheral groove is conical.

The top sleeve thus allows itself to be pressed down through the cartridge opening, and a seal is achieved against the edge of the opening, respectively at the groove, the collar and the upper edge of the conical segment.

The conical segment of the top sleeve naturally allows itself to be deformed under the influence of a certain force, in that the material is an elastomer, and in that the peripheral groove constitutes a weakening of the thickness of the top sleeve, whereby the collar at the groove can be bent like a hinge in relation to the conical segment.

The filter cartridge is inserted by applying a suitable force on the top of the collar, which can be effected e.g. by treading the filter cartridge in place in the cartridge opening.

On the other hand, the removal of the filter cartridge cannot be effected without the use of tools, which are typically pushed in under the collar, after which the sleeve is twisted loose, the reason being that the sleeve is typically subjected to a suitably high pre-stressing force in order for a sufficiently effective sealing to be achieved.

To further ensure the securing of this known filter cartridge, a permanent clamping band of e.g. stainless steel can be inserted at the inner side of the sleeve opposite the peripheral groove, whereby the sleeve opposite the groove is reinforced.

According to patent publication U.S. Pat. No. 5,632,791, it is suggested to use a band which has a diameter which is slightly greater than the inside diameter of the sleeve, and which before being inserted is twisted into a figure eight shape and then inserted into the inner side of the sleeve opposite the peripheral groove. The band increases the pressure against the edge of the cartridge opening, whereby a more effective seal is achieved. However, it is a disadvantage with the above-mentioned type of filter, especially with long filters, that vibrations can arise in the filter, whereby the groove is exposed to frictional influences and herewith wear, which can result in the filter becoming defect.

In FIGS. 1 and 2 there is shown a filter cartridge 1 with a sleeve 22 and a bottom 21, and a filter 3 of the same type as the cartridge according to this patent publication.

Another type of filter cartridge is known from patent publication WO 90/11116, which is inserted on the outer side of the filter housing and which consists mainly of the following two parts which are of the same material, preferably polyurethane: An outer filter part consisting of a top sleeve, a bottom sleeve and a cylindrical, pleated filter which is placed between them, and an inner filter part, similarly with a top and bottom part and a cylindrical filter which at the same time serves as a strengthener.

The outer part of the top sleeve has an outer groove which engages with the cartridge opening for the filter, and in which the filter hangs.

Diametrically opposite the outer groove on the outer part of the top sleeve, the inside of the top sleeve is provided with a further groove. The inner part has a projection or a ridge which enters into engagement with this groove, whereby the securing of the outer part to the cartridge opening is stabilised, and whereby the correct axial positioning of the inner part is determined.

When mounting the filter, which is intended to be mounted from the outer side of the filter housing, the outer part is first secured in the cartridge opening at the above-mentioned outer groove. Hereafter, the inner part including the inner filter is inserted in the outer part until the above-mentioned projection engages in the internal groove. Moreover, a projection and a groove are also provided in the filter's bottom parts.

Removal of the filter is normally effected by inserting a knife-like tool in between the cartridge opening and the groove in the top sleeve, after which the filter in assembled condition can be twisted loose. However, this typically requires the use of a considerable amount of physical effort.

Finally, from the U.S. Pat. No. 5,308,485, there is known a filter cartridge with an expansion part. The expansion part comprises an annular, radially-extending bead arranged to deform the filter's collar so that it is secured in the cartridge opening. This gives rise to several disadvantages, the most significant of which is that the collar of the filter, the expansion part and the cartridge opening must fit one another quite precisely from the point of view of dimensions. If this is not the case, use must be made of a spacing element in order for the filter to be mounted correctly, as explained and shown in FIG. 8 of the American patent publication. Such demands that the individual parts must fit each other precisely made it necessary for stocks to be held of filters, expansion parts and spacing elements in many dimensions in order to be able to supply filters for filter housings of different types. Furthermore, problems arise regarding different plate thicknesses in the cell plates provided with openings in the filter housings of different constructions and embodiments. Finally, it can be ascertained that the construction according to the latter-mentioned American patent consists of four parts, which increases the costs.

SUMMARY OF THE INVENTION

It is the object of the present invention to provide a filter cartridge with an expansion part which for a given effective sealing is considerably easier to mount, and which can be mounted in many different filter, housings while at the same time providing an effective seal.

In that the expansion part comprises two ridges arranged as disclosed, it is possible for one size of filter to be inserted in openings of different sizes (diameters), that different plate thickness in the cell plate provided with openings in the filter housing can be accepted, and that even slightly oval holes in the cell plate can be accepted without any reduction in the desired quality of filtration. This is achieved by sharing the sealing function between two annular ridges instead of only one. Moreover, the result of this configuration is that the filter cartridge according to the invention consists of only two parts, which means that production and storage costs are reduced.

With the filter cartridge according to the present invention, the advantage is achieved that while using a suitable number of different expansion parts, a given number of filter sizes can be accommodated in a larger number of cartridge openings of different dimensions and differently dimensioned plate thicknesses.

With the filter according to the invention, it is achieved that even with very long filters of e.g. 2 m in length, and under conditions where considerable turbulence arises in the filter, a very secure, vibration-free and reliable fixing and sealing is achieved.

Further advantages will become apparent in the detailed description of the invention.

DETAILED DESCRIPTION OF PREFERRED EMBODIMENTS

Figure 1:
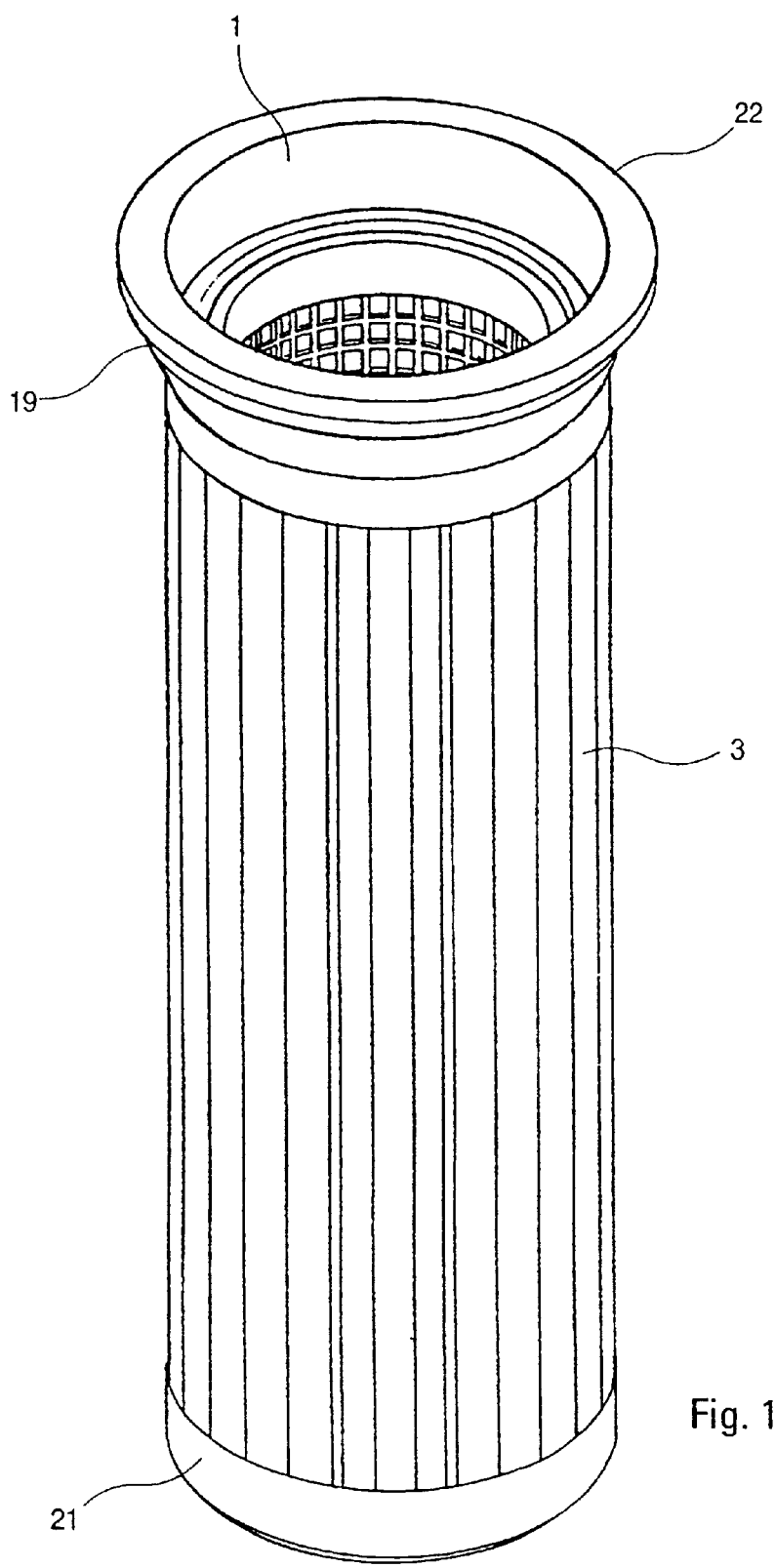
FIG. 1 shows a known filter cartridge.
Figure 2:
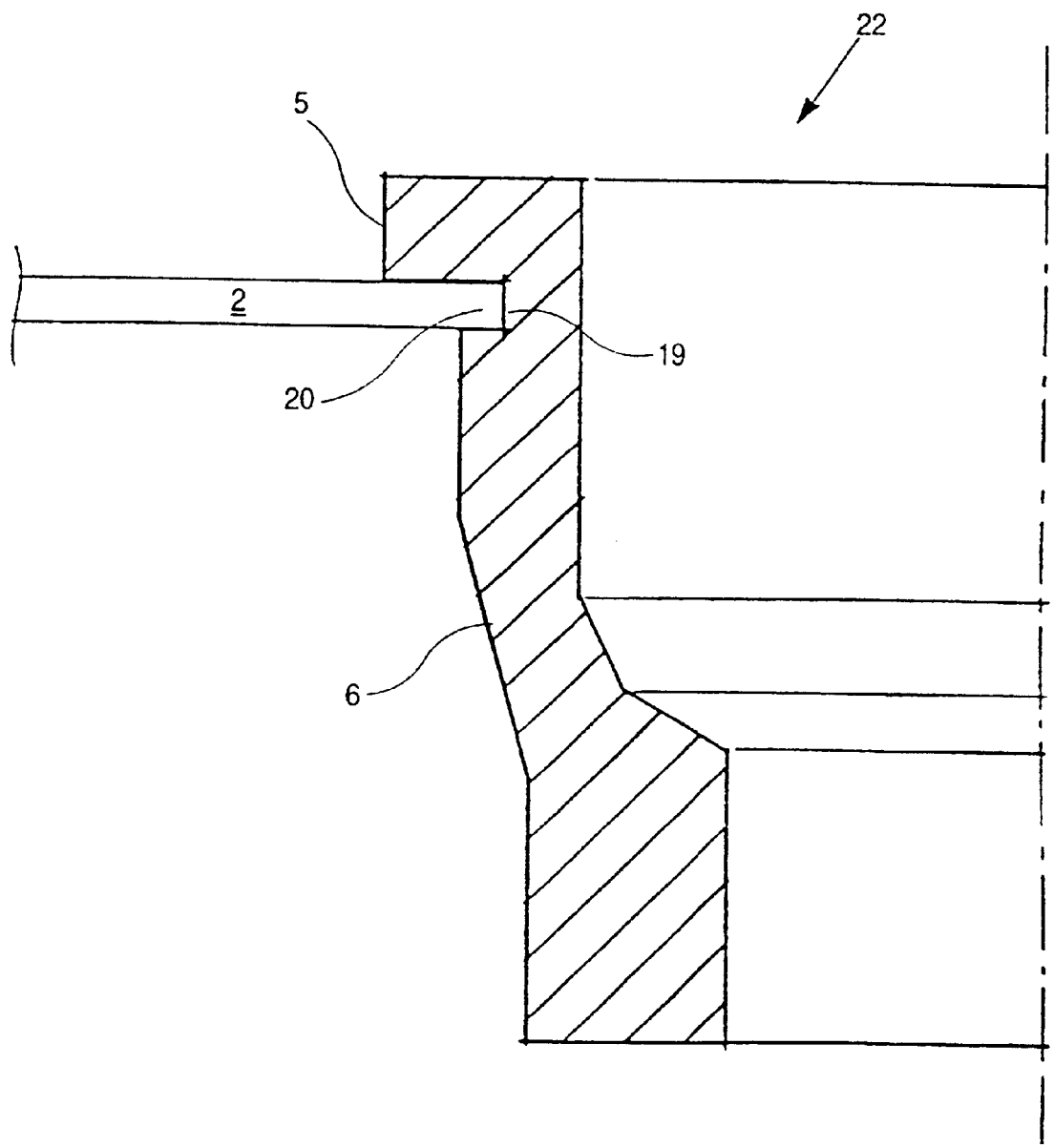
FIG. 2 shows a rotation-symmetrical section of a collar on the filter cartridge according to FIG. 1.

The invention will now be described in more detail with reference to the drawing.

Figure 3:
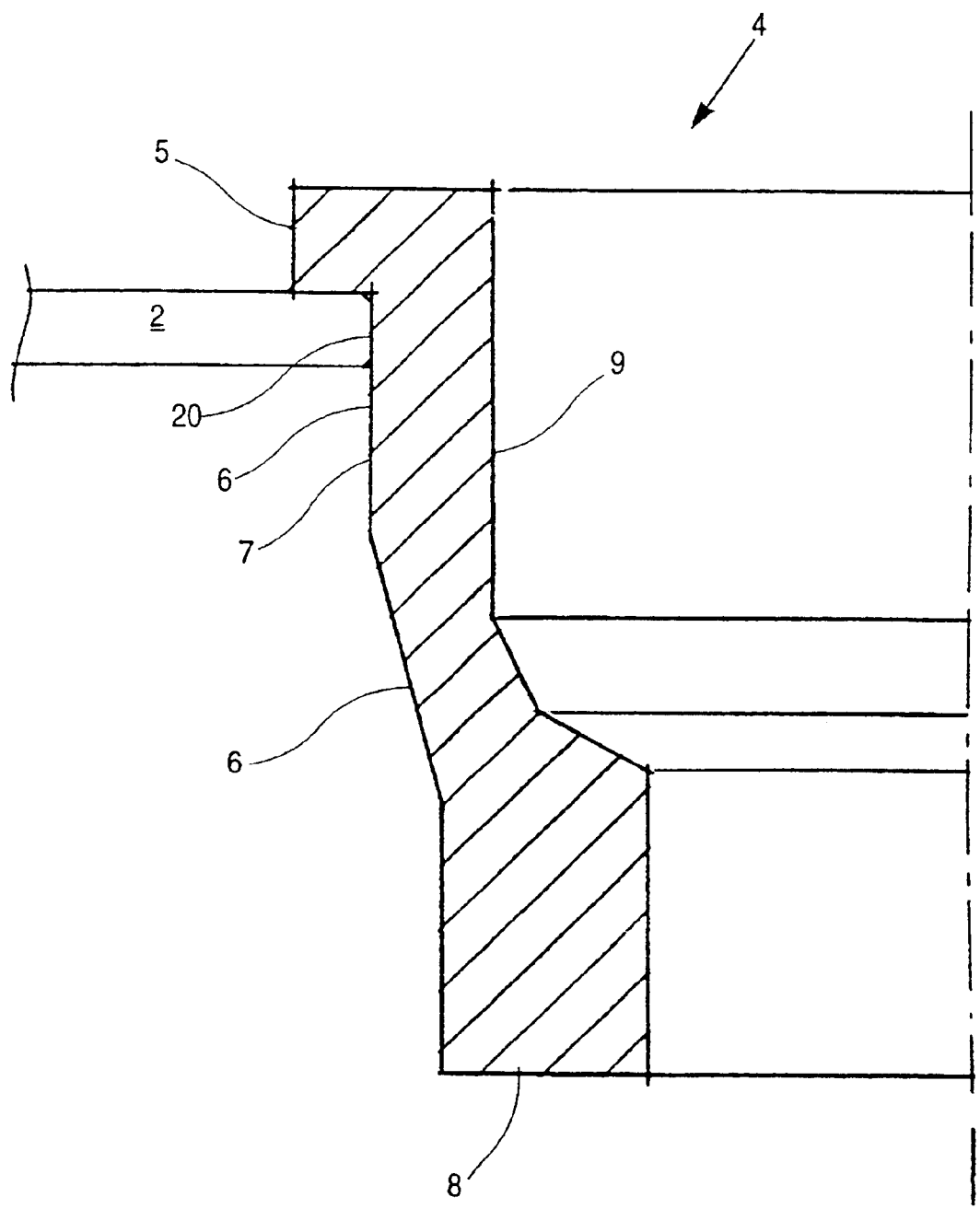
FIG. 3 shows a section of a collar on the filter cartridge according to a second known embodiment, where the collar is inserted in a cartridge opening of a plate.

In FIG. 3 is seen a section of the collar 4 on the filter cartridge 1 inserted in the cartridge opening 20 of a plate 2 in a filter housing.

The collar 4 is made of elastomeric material and comprises a flange 5 which lies up against the plate 20. The collar is basically annular in shape. On the outer side of the collar there is a straight part 7 immediately below the flange 5. Further downwards, the diameter of the collar decreases further to form a conical part 6. Seen in cross-section, the lower part of the collar is of slightly greater thickness than upwards at the flange, in that the lower end 8 serves to secure the pleated filter itself, which with advantage can be fastened hereto by moulding the filter into the collar.

In the collar 4 there is inserted an expansion part 10,10' in the manner of a plug, whereby the collar and herewith the outer side of the collar immediately under the flange are distended and tighten against the cartridge opening. A seal is thus achieved by the elastic compression of the collar. Compared with the collar, the expansion part itself is made of a relatively stiff material.

The expansion part 10, 10' comprises a lower conical part 16 which is dimensioned to form an accommodating fit lying up against the inner surface 9 of the collar 4, see FIG. 3.

Figure 4:
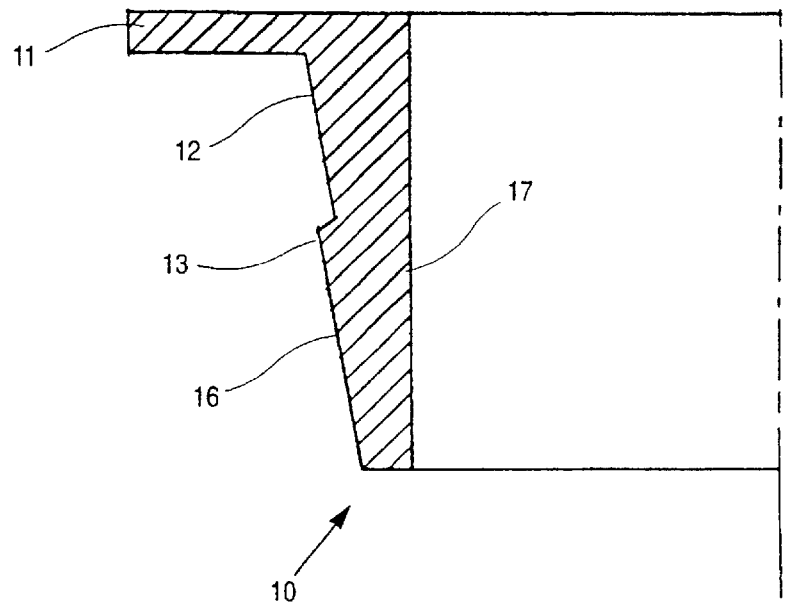
FIG. 4 shows a section of an expansion part for the filter cartridge in FIG. 3.

As shown in FIG. 4, the outer side of the expansion part 10 has a single ridge 13 which is placed in a position which, when the expansion part is finally inserted in the collar 4, lies immediately below the side of the plate 2 facing away from the flange 5 of the collar 4. Upon insertion of the expansion part 10 in the collar 4, an increase hereby arises in the diameter of the formerly substantially straight contact part 7 of the collar in the area of the edge of the cartridge opening 20 in the plate 2, whereby the necessary tightening arises between the plate 20 and the flange 5 and the contact part 7, respectively, by the compression of the elastic collar 4.

Figure 5:
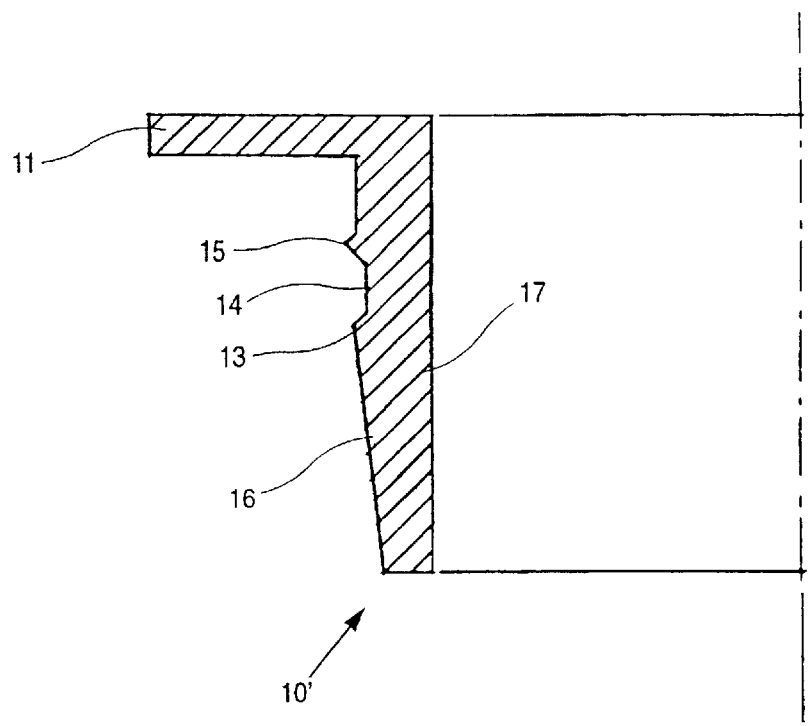
FIG. 5 shows an expansion part according to the invention.

In an example embodiment according to the invention shown in FIG. 5, the expansion part is provided with two ridges 13 and 15 and a plane, annular intermediate part 14.

When the expansion part 10' is inserted in the collar 4, the first ridge 13 is disposed opposite the second side of the plate in which the cartridge opening is provided, i.e. that side which faces away from the flange 5, whereby the first ridge 13 forms a projection on a predominantly straight part 7 of the collar below the flange 5 to secure and tighten the collar 4 in the cartridge opening 20 in the plate 2. The part 12 above the ridge 13 is conical.

When the expansion part 10' is inserted in its final position in the collar 4, the second ridge 15 lies opposite the first side of the plate 2 facing the flange 5, or slightly above this first side of the plate in a position which lies on a level with the flange 5 of the collar.

This second ridge 15 prevents the collar 4 from contracting too much under the influence of the first ridge 13 in the area around the edge of the flange 5 and the straight part 7 below the flange. Moreover, the two ridges manifest themselves in concentrated pressure around the edges of the plate 2. Especially, if the thickness of the collar 4 is small, this second ridge 15 contributes towards ensuring that the collar in this area lies tightly up against the cartridge opening 20.

The top of the expansion part 10, 10' is provided with a stop edge 11 or flange which determines the fully inserted position of the expansion part in the collar. This stop edge could also be disposed on the opposite side of the expansion part, so that such a lower stop edge fits into a suitable recess in the inner side 9 of the collar.

In the embodiment of the expansion part shown in FIGS. 4 and 5, the stop edge 11 also serves as an attack point for the removal of the expansion part. The removal is effected by gripping around or under the stop edge with a suitable tool and withdrawing the expansion part 10, 10' from the collar 4.

Figure 6:
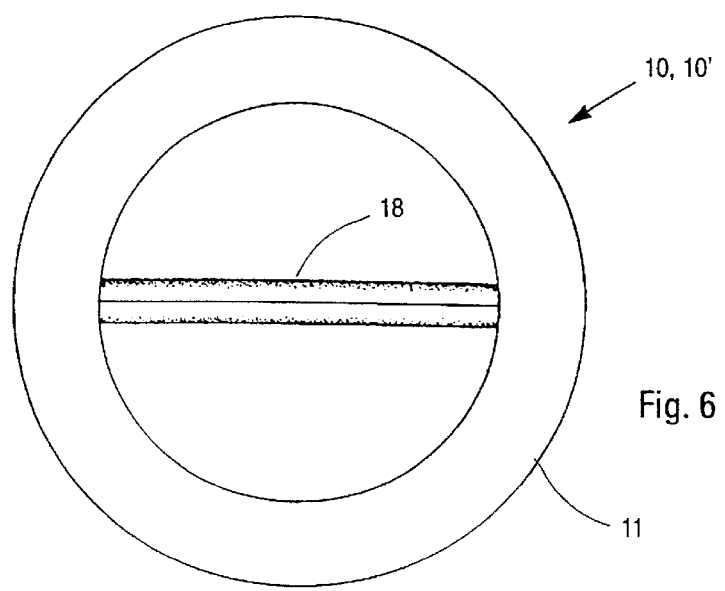
FIG. 6 shows an example embodiment of an expansion part according to the invention.

The expansion part 10, 10' can, however, also be provided with an extraction grip 18, shown in FIG. 6, which consists of a bar arranged at right angles to the symmetrical axis of the filter cartridge, and which is connected to two diametrical points on the inner side 17 of the expansion part. It is expedient for such an extraction grip to be configured as narrow as possible and to be tapered in the direction of the symmetrical axis of the filter, so that it affords only a negligible resistance to the flow of air through the filter.

Figure 8:
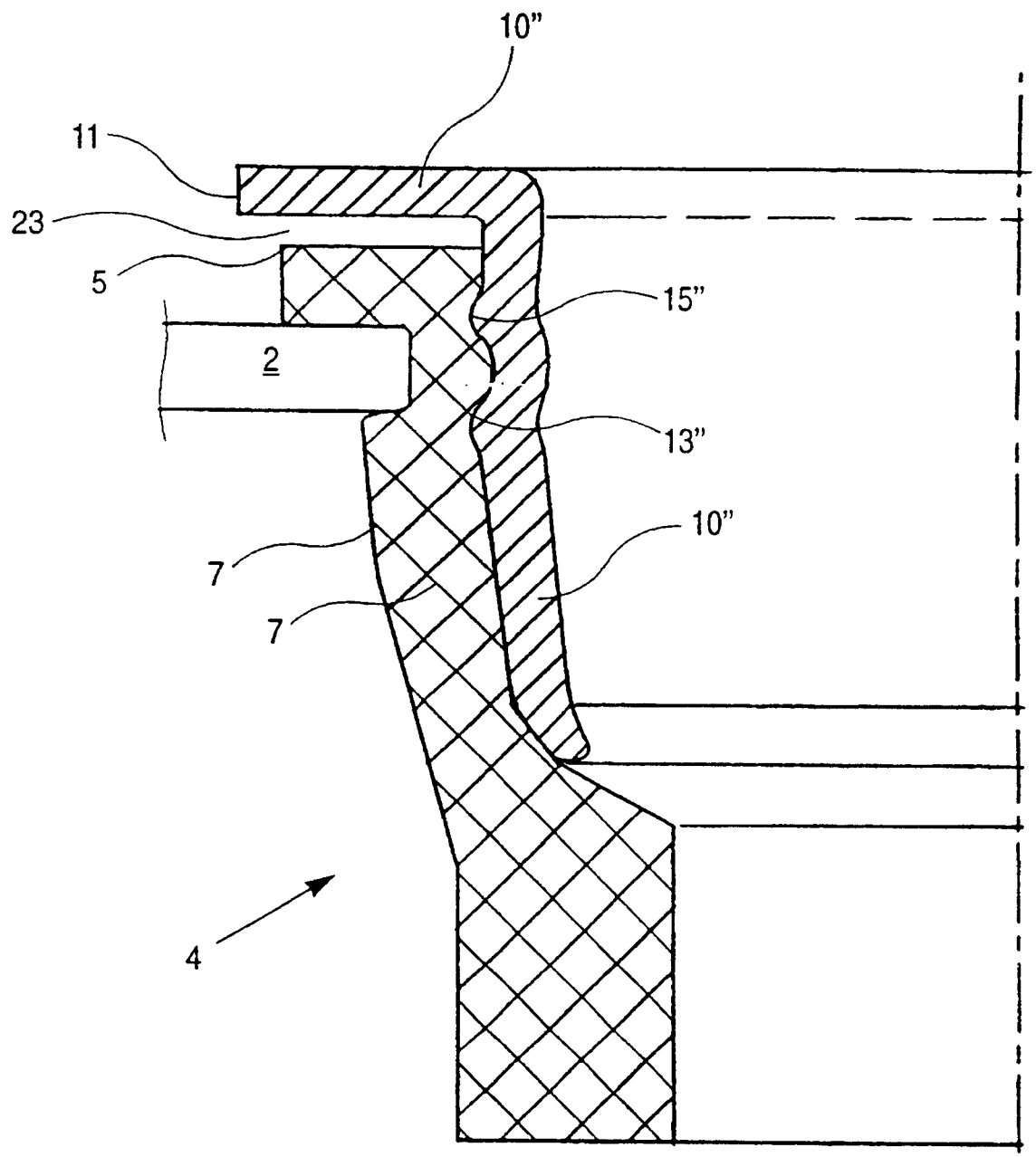
FIG. 8 shows a second embodiment of the expansion part according to the invention, corresponding to FIG. 7.

In FIG. 8 there is shown an embodiment where the expansion part 10" is configured with an annular lip, so that at the sides of this lip two annular ridges 13" and 15" appear for the securing of the filter cartridge. In this embodiment, the stop edge 11 is placed so that it lies at a distance from the flange 5 when the flange is in place. There is hereby provided an annular clearance 23 which can be advantageous in the removal of the expansion part.

In order to facilitate the insertion of the expansion part and its removal from the collar, use can be made of a friction-reducing agent such as oil or graphite on the inner side of the collar. The outer side of the expansion part can also be provided with a layer of Teflon™.

Since the collar is made of a resilient material, a collar with a given diameter can be made to fit cartridge openings of varying diameters within a certain interval extending from the diameter of the collar to about 10% larger, in that for the given cartridge opening, an expansion part with a suitably larger diameter is used, whereby the collar will expand to fit inside the slightly larger cartridge opening.

A given size of collar (with filter) can also be used with different plate thicknesses, whereby use is made of differently-dimensioned expansion parts with ridges which are placed in positions which correspond to the given plate thicknesses.

There is hereby achieved a reduction in the cost of production and storage.

Figure 7:
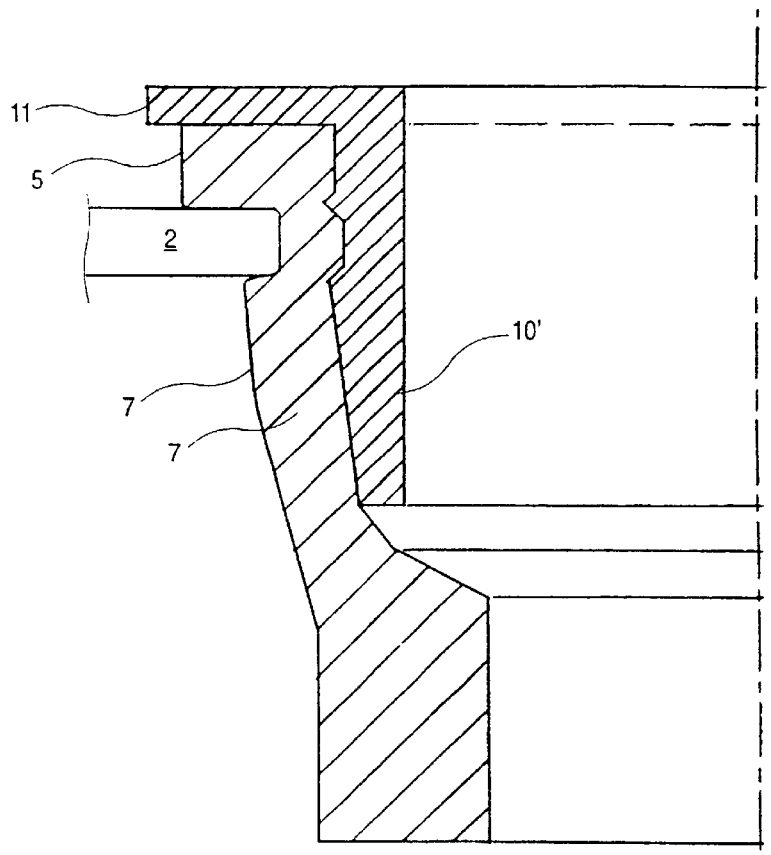
FIG. 7 shows the expansion part shown in FIG. 5 inserted in the filter cartridge shown in FIG. 3.

The filter cartridge with expansion part according to the invention is extremely easy to mount and remove, in that the insertion of the filter cartridge is effected with a predominantly friction-free placing of the collar in the cartridge opening, after which the expansion part is inserted in the collar and thereafter e.g. trodden into place. FIG. 7 shows an expansion part 10' inserted in a collar, e.g. the collar shown in FIG. 3.

The removal has also been simplified, in that the relatively hard expansion part constitutes a good point of engagement for tools, and where the example embodiment with hand grip is concerned, the removal does not necessarily require the use of tools.

Moreover, it is an advantage with the filter cartridge according to the invention that the worn-out, often dirty filter is not exposed to stresses or twisting to any significant degree, so that the dust and dirt which has collected in the filter is not spread to the surroundings or comes into contact with the personnel who undertake the removal of the filters.

What is claimed is:

1. Filter cartridge (1) for insertion in a cartridge opening (20) in a plate (2), and where the filter cartridge comprises a predominantly cylindrical filter (3) and an outer annular collar (4) made of an elastomer or rubber, and which fastens against the predominantly cylindrical filter, and where the tubular collar (4) has a flange (5) which in inserted position lies up against a first side of the plate (2) down in the cartridge opening, and where the filter cartridge (1) further comprises an expansion part (10, 10') which is configured to be inserted in the outer, annular collar (4), in that the outer side (6) of the collar below the flange has a diameter which, in an uninfluenced state, does not substantially exceed the diameter of the cartridge opening (20), and in that the expansion part (10, 10') is arranged to be inserted in the axial direction in the collar (4) from a side of the filter cartridge where the flange (5) is disposed, and that the expansion part (10, 10') is made of a material which is relatively stiff in comparison with the collar (4), and comprises a first ridge (13) which on the expansion part (10, 10') is placed opposite a second side of the plate which faces away from the flange (5), when the expansion part (10) is inserted in the collar (4), whereby the ridge (13) forms a projection on a substantially straight part (7) of the collar below the flange (5) for the fastening in and sealing of the collar (4) to the cartridge opening (20), comprising:

the expansion part (10') further comprises a second ridge (15) which, when the expansion part (10') is inserted in the collar (4), lies opposite the first side of the plate (2) in which the cartridge opening (20) is provided, or slightly above this side in a position which lies on a level with the flange (5).

2. Filter cartridge according to claim 1, wherein:

on the straight part (7) under the flange (5), the collar (4) has a diameter of around 90%–100% of the diameter of the cartridge opening (20).

3. Filter cartridge according to claim 1 wherein the expansion part (10, 10') is provided with a stop edge (11) which prevents the expansion part (10, 10') from moving further into the collar (4).

4. Filter cartridge according to claim 3, wherein the stop edge (11) is configured as a flange which extends laterally over the flange (5) on the collar (4).

* * * * *